Patented July 5, 1949

2,475,163

UNITED STATES PATENT OFFICE 2,475,163

RHODACARBOCYANINE DYES AND METHOD OF PREPARATION

Thomas Robert Thompson, Binghamton, N. Y., assignor to General Aniline & Film Corporation, New York, N. Y., a corporation of Delaware No Drawing. Application November 1, 1944, Serial No. 561,499

5 Claims. (Cl. 260—240)

My invention relates to a novel process for the preparation of symmetrical rhodacarbocyanine dyes and to the dyes obtained thereby. Such dyes are useful in the preparation of photographic emulsions in order to improve the sensitizing action thereof.

More particularly, my invention relates to the production of symmetrical dyes of the type which may be represented by the following formula:

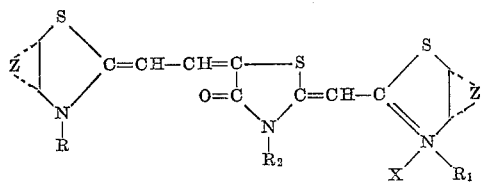

In the above formula, Z stands for the remainder of a benzene or naphthalene nucleus; R, $R_1$, represent alkyl or aryl groups such as methyl, ethyl, phenyl; and $R_2$ stands for alkyl including alkylene and aryl groups such as methyl, ethyl, phenyl and allyl. X stands for an anion such as chlorine, bromine, and iodine.

Heretofore, the production of rhodacarbocyanine dyes involved an intricate process requiring at least three distinct steps. First, it was necessary to prepare the merocyanine dye from a suitable cycloammonium quaternary heterocyclic salt and a heterocyclic compound containing a nitrogen-ketone-methylene nucleus in the ring, as, for example, rhodanine. After the preparation of the merocyanine dye, it was then necessary to alkylate the latter and then in a third step couple the alkylated merocyanine dye with a third heterocyclic compound. Thus, at least three complete steps were required and this complicated procedure obviously presented many disadvantages. The prior art procedure is, in general exemplified by British Patent No. 489,335 of July 22, 1938.

I have now discovered that the prior art procedure can be considerably simplified and that these dyes can be prepared in a single batch process. In general, I have found that symmetrical rhodacarbocyanine dyes can be prepared by simultaneously reacting together a quaternary salt of a 2-methylbenzthiazole or 2-methylnaphthiazole, ethyl orthoformate, and a rhodanine in the presence of an acetanilide. The salt of the 2-methylthiazole compound is used in the proportion of approximately two mols to one mol of the rhodanine compound.

In my process all the ingredients are present in one mixture and the rhodacarbocyanine dye is obtained in a single reaction. It will be seen that the process is very simple, and overcomes the need for the multiplicity of steps which have heretofore been required. In my process the dyes are readily formed by simply heating or refluxing the reactants together.

The course of the reaction may be represented as follows:

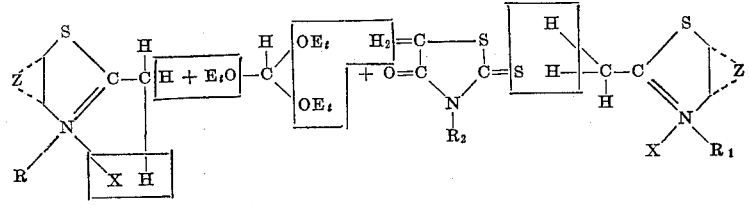

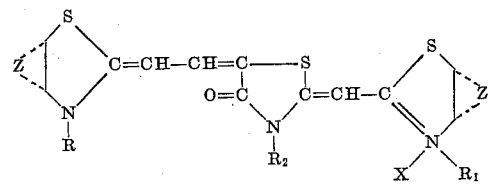

$R, R_1, R_2, X$, and $Z$ have the same significance as indicated above.

The following examples will serve to illustrate my invention:

Example 1

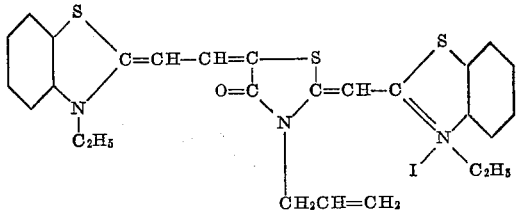

3.05 g. (0.01 mol) 2-methylbenzthiazole ethiodide, 0.87 g. (0.005 mol) 3-allylrhodanine, 5 cc. ethyl orthoformate, and 6 g. acetanilide were mixed and heated at reflux for 30 minutes. The reaction mixture was digested with 100 cc. of methanol and filtered hot. The residue from the alcoholic digestion, after further digestion with 50 cc. of nitromethane, weighed about 1.1 g. and gave a spectrum, when incorporated in a photographic emulsion, which had a maximum of 630 millimicrons and a range of from 520–680 millimicrons.

*Example 2*

The process is the same as in Example 1 except that in place of 2-methylbenzthiazole ethiodide there is used .01 mol of 2-methylbenzthiazole methiodide.

*Example 3*

The procedure is the same as in Example 1 except that for the 3-allylrhodanine there is substituted 0.005 mol of 3-phenylrhodanine.

*Example 4*

The procedure is the same as in Example 1, except that in place of the 2-methylbenzthiazole ethiodide there is used 0.01 mol of 2-methyl-beta-naphthiazole ethiodide.

The thiazoles employed may be substituted or unsubstituted in the aryl nucleus and may contain such substituent groups as methyl, ethyl, propyl, isopropyl, aryl such as phenyl, and aralkyl such as benzyl groups. Also included in such substituent groups may be alkoxy such as methoxy, ethoxy, aryloxy, phenoxy and phenyl ether type of substituents. These compounds are used in the form of their quaternary salts which may be obtained from alkyl halides such as ethyl chloride, methyl bromide and ethyl iodide.

Besides the rhodanines mentioned in the examples there may be used others, such as 3-methylrhodanine, 3-ethylrhodanine, 3-naphthylrhodanine, as well as 3-benzylrhodanine.

Instead of acetanilide there may be employed, for example, substituted acetanilides such as p-chloro acetanilide. There may be present in the phenyl ring of the acetanilide various substituents such as methyl, ethyl, butyl, hydroxy and other groups.

Thus, it will be seen that my novel process provides a simple and economical method for the production of symmetrical rhodacarbocyanine dyes which avoids the complicated procedures heretofore required for producing such dyes. Another advantage of my process is that the reaction does not require the presence of solvents in addition to the reactants.

I claim:

1. A process for preparing symmetrical rhodacarbocyanine dyes which comprises simultaneously reacting together in the presence of an acetanilide two mols of a quaternary salt of a thiazole selected from the group consisting of a 2-methylbenzthiazole and a 2-methylnaphthiazole, with one mol each of ethyl orthoformate and a rhodanine, and recovering a dye which is characterized by the following general formula:

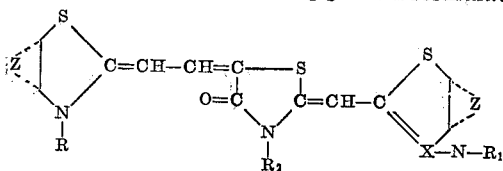

where Z stands for the remainder of a nucleus selected from the group consisting of benzene and naphthylene nuclei, R and R₁ are selected from the group consisting of alkyl and aryl groups, R₂ is selected from the group consisting of alkyl, allyl and aryl groups, and X stands for a halogen.

2. A process for preparing symmetrical rhodacarbocyanine dyes which comprises simultaneously reacting together in the presence of acetanilide two mols of a quaternary salt of a thiazole selected from the group consisting of a 2-methylbenzthiazole and a 2-methylnaphthiazole, with one mol each of ethyl orthoformate, and a rhodanine, and recovering a dye which is characterized by the following general formula:

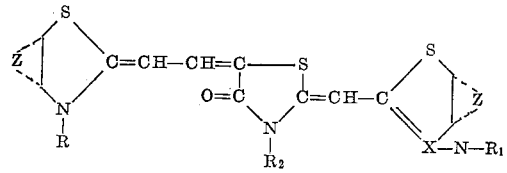

where Z stands for the remainder of a nucleus selected from the group consisting of benzene and naphthylene nuclei, R and R₁ are selected from the group consisting of alkyl and aryl groups, R₂ is selected from the group consisting of alkyl, allyl and aryl groups, and X stands for a halogen.

3. The process of producing a symmetrical rhodacarbocyanine dye which comprises simultaneously reacting together about 2 mols of 2-methylbenzthiazole ethiodide, about 1 mol of 3-allylrhodanine, ethyl orthoformate and acetanilide, and recovering a dye having the following formula:

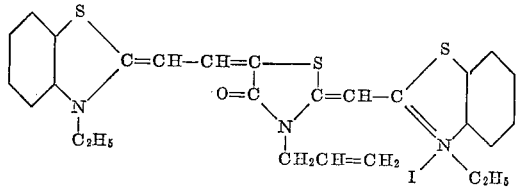

4. The process of producing a symmetrical rhodacarbocyanine dye which comprises simultaneously reacting together about 2 mols of 2-methyl-β-naphthiazole ethiodide, about 1 mol of 3-allylrhodanine, ethyl orthoformate and acetanilide, and recovering a dye having the following formula:

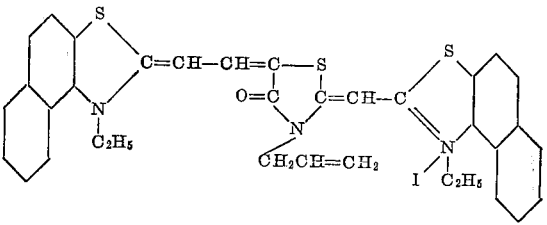

5. The process of producing a symmetrical rhodacarbocyanine dye which comprises simultaneously reacting together about 2 mols of 2-methylbenzthiazole ethiodide, about 1 mol of 3-phenylrhodanine, ethyl orthoformate and acetanilide, and recovering a dye having the following formula:

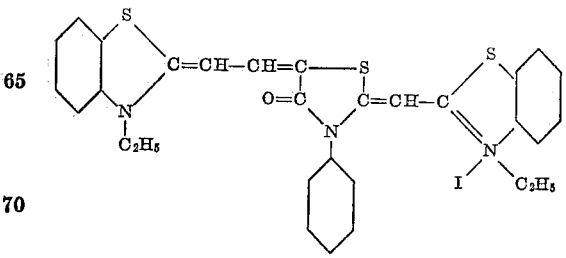

THOMAS ROBERT THOMPSON.

(References on following page)

REFERENCES CITED

The following references are of record in the file of this patent:

UNITED STATES PATENTS

| Number | Name | Date |
|---|---|---|
| 2,265,908 | Kendall | Dec. 9, 1941 |
| 2,388,963 | Fry | Nov. 13, 1945 |

FOREIGN PATENTS

| Number | Country | Date |
|---|---|---|
| 218,381 | Switzerland | 1942 |
| 509,927 | Great Britain | 1939 |

Certificate of Correction

Patent No. 2,475,163. July 5, 1949.

THOMAS ROBERT THOMPSON

It is hereby certified that errors appear in the printed specification of the above numbered patent requiring correction as follows:

Column 3, claim 1 and column 4, claim 2, for the right-hand terminal nucleus of the formulae, in each instance for

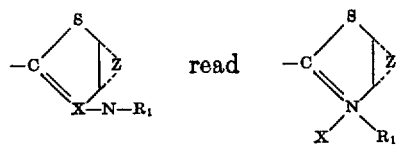

and that the said Letters Patent should be read with these corrections therein that the same may conform to the record of the case in the Patent Office.

Signed and sealed this 29th day of November, A. D. 1949.

[SEAL]

THOMAS F. MURPHY,
*Assistant Commissioner of Patents.*